United States Patent [19]

Harpin

[11] Patent Number: 5,366,411
[45] Date of Patent: Nov. 22, 1994

[54] FLEXIBLE COUPLING INCORPORATING ELASTOMERIC ELEMENTS WITH EMBEDDED BUSHES

[75] Inventor: Graham E. Harpin, Halifax, England

[73] Assignee: Holset Engineering Company, Ltd., Huddersfield, United Kingdom

[21] Appl. No.: 8,821

[22] Filed: Jan. 25, 1993

Related U.S. Application Data

[63] Continuation of Ser. No. 918,151, Jul. 24, 1992, abandoned, which is a continuation of Ser. No. 553,495, Jul. 13, 1990, abandoned.

[30] Foreign Application Priority Data

Jul. 13, 1989 [GB] United Kingdom ............... 8916045

[51] Int. Cl.⁵ .............................................. F16D 3/50
[52] U.S. Cl. .......................................... 464/17; 464/83; 464/91
[58] Field of Search ................. 464/17, 83, 89, 91, 464/93, 94, 96, 95

[56] References Cited

U.S. PATENT DOCUMENTS

| | | | |
|---|---|---|---|
| 1,458,148 | 6/1923 | Reed | 464/89 X |
| 1,684,773 | 9/1928 | Marks | 464/91 |
| 1,946,661 | 2/1934 | Baker | 464/89 |
| 1,993,094 | 3/1935 | Guy | 464/89 |
| 2,107,689 | 2/1938 | Bugatti | 464/89 X |
| 2,326,450 | 8/1943 | Fawick | 464/83 |
| 2,971,356 | 2/1961 | Reuter et al. | 464/89 |
| 3,199,186 | 8/1965 | Simpson | 464/89 X |
| 3,245,229 | 4/1966 | Fädler | 464/91 X |
| 3,283,534 | 11/1966 | Reich | 464/91 X |
| 3,478,539 | 11/1969 | Daur | 464/89 |
| 3,727,431 | 4/1973 | Yokel | 464/89 X |
| 3,813,897 | 6/1974 | Hiersig et al. | 464/91 |
| 3,837,178 | 9/1974 | Hackforth et al. | 464/89 |
| 4,150,587 | 4/1979 | Bremer, Jr. | 464/89 X |
| 4,175,406 | 11/1979 | Downey | 464/91 |
| 4,216,842 | 8/1980 | Decouzon | 464/93 X |
| 4,385,893 | 5/1983 | Kirschey | 464/89 X |
| 4,702,722 | 10/1987 | Narue et al. | 464/93 |

FOREIGN PATENT DOCUMENTS 2248881 10/1972 Germany ................. 464/17

Primary Examiner—Daniel P. Stodola
Attorney, Agent, or Firm—Gary M. Gron

[57] ABSTRACT

A flexible coupling in which segmented elastomeric coupling elements are fixed to radially extending from immovable flanges on annular inner and outer coupling members by a fastening system. A plurality of bushes in the elastomeric elements receive bolts extending from movable clamping plates to the immovable flanges to hold the elastomeric elements in compression.

7 Claims, 1 Drawing Sheet

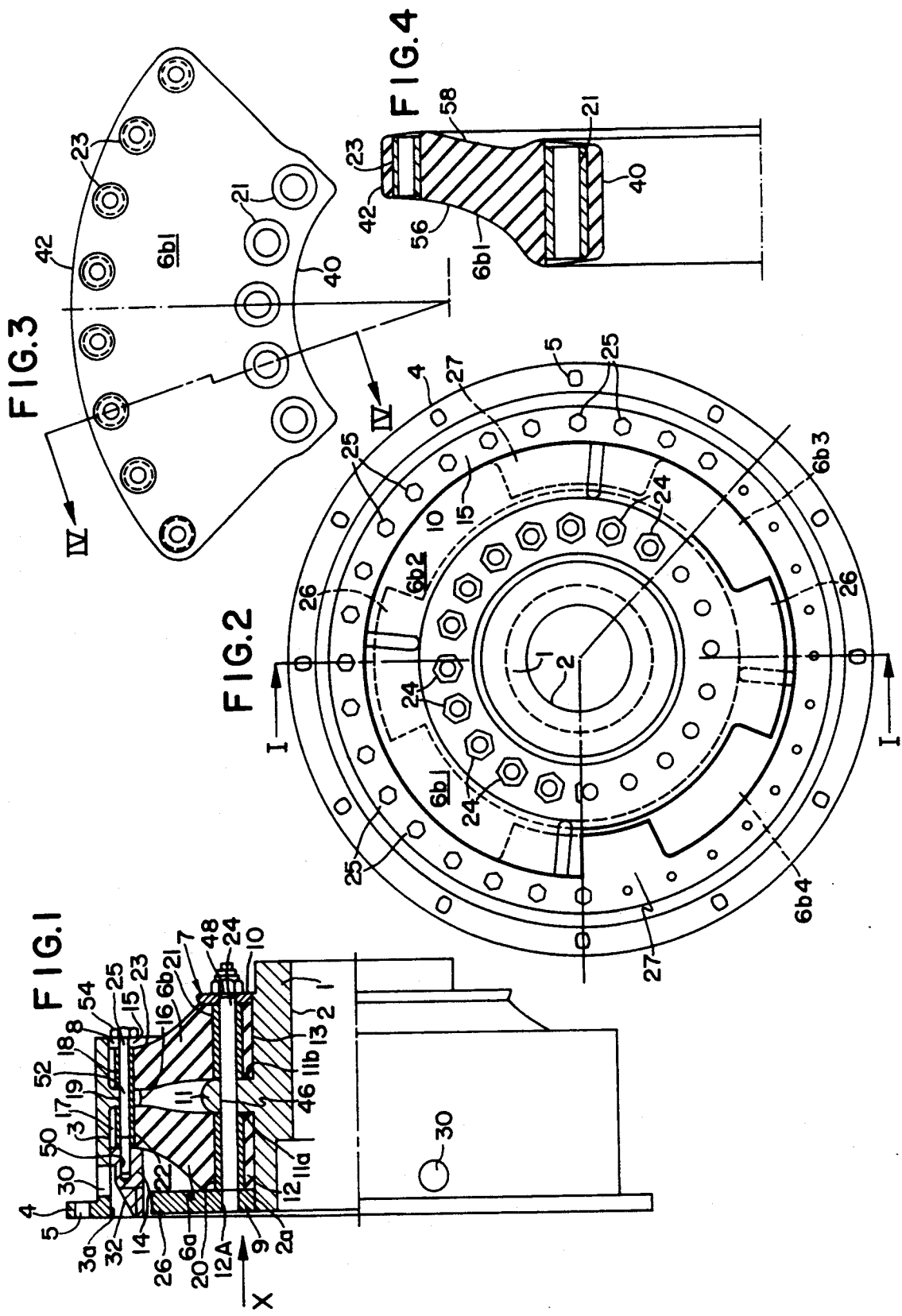

FLEXIBLE COUPLING INCORPORATING ELASTOMERIC ELEMENTS WITH EMBEDDED BUSHES

This application is a continuation of Ser. No. 07/918,151, filed Jul. 24, 1992, now abandoned, which is a continuation of Ser. No. 553,495, filed Jul. 13, 1990, now abandoned.

DESCRIPTION

This invention relates to a flexible coupling.

According to the present invention, there is provided a flexible coupling comprising a coupling element of elastomeric material interconnecting two coupling members and fixed to at least one of them by means of a fastening system including a plurality of rigid bushes embedded in the coupling element and held immovably with respect to the coupling member by clamping plates which are urged together by fasteners extending through said bushes.

Preferably, the coupling element is fixed to both coupling members by respective fastening systems which are radially spaced with the coupling element extending radially and circumferentially therebetween. In operation of this flexible coupling the elastomeric material of the coupling element will therefore be subject to shear stresses but by virtue of the fastening system as defined such stresses are not imparted to the fasteners with obvious advantages in terms of the life of the coupling.

The invention will now be further described by way of example only, with reference to the accompanying drawing, in which:

FIG. 1 is a longitudinal section of one embodiment of flexible coupling in accordance with the invention, on the line I—I of FIG. 2;

FIG. 2 is an end view mainly from the right of FIG. 1 but with a partial view in the direction of arrow X;

FIG. 3 is an end view of one segment of the elastomeric coupling element, and

FIG. 4 is a section of the coupling element segment on the line IV—IV of FIG. 3.

Referring now to the drawings, the flexible coupling of FIGS. 1 and 2 comprises a cylindrical inner coupling member 1 having an axial bore 2 for receiving a shaft (not shown). Radially spaced from the inner member 1 is a cylindrical outer coupling member 3 with a radial connecting flange 4 having apertures as indicated at 5 for receiving fasteners for fastening the coupling member 3 to a flywheel or flanged shaft (not shown). The inner and outer coupling members 1, 3 are resiliently interconnected by an elastomeric coupling element which is provided in this case in two mirror-symmetrical axially spaced halves 6a, 6b each of which is divided equi-angularly into four closely adjacent circumferential segments indicated at 6b1/2/3 and 4 in FIG. 2. The coupling elements 6a, 6b (one of which is shown in FIG. 3) are made of unreinforced elastomeric material which may be natural or synthetic rubber. The coupling elements have inner diametrical surfaces 40 and outer diametrical surfaces 42.

The radially inner and outer edges of the coupling element are fixed to the coupling members 1, 3 by respective fastening systems 7, 8. The fastening system 7 comprises axially spaced annular clamping plates 9, 10 slidably mounted on the outer cylindrical surface 2a of the coupling member 1 at opposite sides of an integral flange 11 having opposite side faces 11a and 11b which provide clamping surfaces cooperating with the plates 9, 10, respectively. The clamping plate 9 thus defines with the opposed clamping surface 11a of the integral flange 11 a recess 12 which is filled by the radially inner edge of the coupling element half 6a, the corresponding edge of the coupling element half 6b filling the similarly defined adjacent recess 13 between surface 11b and plate 10.

In like manner the fastening system 8 of the outer coupling member 3 comprises clamping plates 14, 15 slidable on the inner cylindrical surface 3a of the coupling member 3 which has an integral flange 16 projecting inwardly towards the opposing flange 11 of the fastening system 7. The clamping plates 14, 15 and the wall 16 together define recesses 17, 18 facing the corresponding recesses 12, 13. The integral flanges 11, 16 are dimensioned so as to provide a substantial air space between each other and the coupling element halves 6a, 6b and the outer wall 16 is provided with a plurality of radial air passages 19, in between adjacent bushes 22, 23 described below for ventilating this air space through centrifugal force. In addition, passages 30 in member 3 provide a cooling flow of air past grooves 32 in clamping plate 14 for ventilating the space to the aft of coupling half 6a, as viewed in FIG. 1.

Each circumferential segment of coupling element halves 6a, 6b is provided with a ring of bushes at its inner and outer edges as shown in greater detail in FIGS. 3 and 4 which illustrate one segment 6b1 in greater detail. It should be noted that in the illustrated embodiment one 90° segment is duplicated 8 times to make up the elastomeric part of the coupling, thus enabling a saving in manufacturing cost due to small molds and in servicing because only the appropriate segment need be replaced. The inner bushes 20, 21 are received in the recesses 12, 13 respectively whereas the outer bushes 22, 23 are received in the recesses 17, 18 respectively. The bushes 20, 21 form part of the fastening system 7 and are aligned with apertures 44, 48, 46 in the plates 9, 10 and wall 11, respectively. The bushes 22, 23 form part of the fastening system 8 and are aligned with apertures 50, 54, 52, respectively in the clamping plates 14, 15 and the wall 16. The bushes 20, 21 are also aligned with each other as are the bushes 22, 23. Sets of fasteners 24, 25 hold the bushes in position in the respective recesses. The fasteners 24, 25 are bolts in screw-threaded engagement with the walls 9 and 14 so that on tightening they clamp the bushes in their recesses by means of the clamping plates.

As seen in FIG. 4, which shows the segment 6b1 of the coupling element in the relaxed condition, the inner and outer bushes 20-23 are embedded in the respective side faces 56, 58 of the coupling element in such a way that each end of a bush is slightly recessed into the elastomeric material. The respective distance between side faces 56, 58 of the relaxed coupling element 6a, 6b is thus axially wider than axial dimension of the respective recesses 12 and 13 in the fully tightened condition of the respective fasteners 24, 25. The elements 6a, 6b have a small clearance between their inner and outer diameters 40, 42 and the adjacent outer and inner 3a, 2a cylindrical surfaces, respectively, so as to facilitate assembly. A clearance of approximately 8 to 12 thousandths of an inch gives effective results. In the fully tightened condition, as seen in FIG. 1, the bushes 20-23 are tightly clamped in their recesses and rendered immovable by frictional engagement with the respective clamping walls or surfaces which laterally define the respective recess. Elastomeric material is therefore forced. inwardly of toward the respective recesses 12 and 13 to take up the clearance mentioned above and outwardly towards the inner facing recesses 17 and 18. In consequence, the coupling elements 6a, 6b are subjected to radial compressive stresses which is an advantage in giving the elastomeric material greater endurance under oscillating load conditions. This radial loading also ensures that the bond between the bushes and the elastomeric material, which may be a vulcanized bond, is under a compressive load during operation, thus reinforcing the bond.

The clamping plate 9 has an outward radial projection 26 which is axially aligned with but circumferentially spaced from an inward radial projection 27 from the clamping plate 14, the two projections 26, 27 serving to limit the relative angular movement of the two coupling members 1, 3 to an arc of say 45° for a fail safe limit.

It will be noted that the inner diameter 40 of the coupling element is substantially wider in the axial direction than the outer diameter 42 thereof with a shaded transition between these regions. This configuration of the coupling element, i.e. of its two halves 6a, 6b, is intended to ensure an equal distribution of the tangentially directed shear forces in the coupling element over the radial extent thereof during operation. It has been found that a ratio of approximately 2.3 to one between the dimension of the inner diameter 40 to the outer diameter 42 gives effective results.

It will be appreciated that numerous modifications may be made without departing from the scope of the invention. Thus, for example, the coupling element need not be divided into two halves 6a, 6b nor need it be segmental as described and illustrated. Furthermore, if the coupling element is segmental the number of segments may be reduced or increased to a number less than or greater than 4.

Having thus described the invention, what is claimed as novel and desired to be searched by Letters Patent in the United States is:

1. A flexible coupling comprising:
   a first coupling member having an inwardly facing generally annular surface;
   a second coupling member, coaxial with said first coupling member and having an outwardly facing generally annular surface positioned radially inward from and opposing the annular surface on said first coupling member.
   at least one means for flexibly coupling said first and second coupling members, said one flexible coupling means formed from elastomeric material having axial end faces and being at least partly maintained between said opposed generally annular surfaces;
   means for fastening said one flexible coupling means to said coupling members, said fastening means comprising:
      a plurality of rigid bushes embedded in said one flexible coupling means, said bushes having an axial length less than the axial length of said one flexible coupling means in its unclamped condition, clamping means comprising radially extending flanges immovably carried by said first and second coupling members against which one axial end face of said one flexible coupling means is positioned, and annular plates movable with respect to the first and second coupling members and positioned on the opposite axial end face of said one flexible coupling means to sandwich said one flexible coupling means between said flanges and said annular plates,
      fastening elements extending through said bushes and connected to said annular plates and flanges for clamping against said bushes and holding them immovably with respect to said coupling members, the relative dimensions of said one flexible coupling means and said opposed annular surfaces being selected so that a clearance is provided between said opposed annular surfaces and said one flexible coupling means in the unclamped state thereof and when said annular plates are clamped against said bushes, said one flexible coupling means is forced outward toward the annular surface on said first coupling member and inward toward the annular surface on second coupling member to maintain said one flexible coupling means in compression against the opposed coaxial generally annular surfaces on said first and second coupling members.

2. A coupling as claimed in claim 1 further comprising a second flexible coupling means having axial end faces one of which is positioned against said immoveable radially extending annular flanges on sides thereof that are opposite to said one flexible coupling means and a second set of annular plates moveable with respect to the first and second coupling members and positioned on the opposite axial end face of said second flexible coupling means to sandwich said second flexible coupling means between said second set of plates and said immoveable radially extending annular flanges, said second flexible coupling means having a plurality of rigid bushes embedded in said second flexible coupling means, said bushes having an axial length less than the axial length of said second flexible coupling means in its unclamped state and a second set of fastening elements extending through the bushes in said second flexible coupling means for clamping against said bushes in said second flexible coupling means and holding them immoveably with respect to said coupling members, the relative dimensions of said second flexible coupling means and said opposed annular surfaces being selected so that a clearance is provided between said opposed annular surfaces and said second flexible coupling means in the unclamped state thereof and when said second set of annular plates are clamped against the bushes in said second flexible coupling means, said second flexible coupling means is forced outward toward the annular surface on said first coupling member and inward toward the annular surface on said second coupling member to maintain said second flexible coupling means in compression against the opposed coaxial generally annular surfaces on said first and second coupling members.

3. A coupling as claimed in claim 2 further comprising passageway means formed in said first coupling member for providing a centrifugally induced flow of cooling air over said flexible coupling means upon rotation of said coupling means.

4. A coupling as claimed in claim 3, wherein one of the moveable annular plates on said first coupling member is provided with a plurality of grooves cooperating with said passageway means in said first coupling member.

5. A coupling as claimed in claim 4, wherein said passageway means further comprises ventilating holes provided in said immoveable flange on said first coupling member.

6. A coupling as claimed in claim 1 wherein said one flexible coupling means is annular in shape and divided into a plurality of adjacent segments around its circumference abutting one another to define its annular shape in its clamped state.

7. A coupling as claimed in claim 1, wherein the two coupling members have angularly spaced opposed projections for limiting the angular movement of the coupling members relative to each other.

* * * * *